United States Patent [19]

Michalik

[11] 4,057,184
[45] Nov. 8, 1977

[54] METHOD OF SCORING GLASS USING A SCORING WHEEL HAVING AN ARCUATE SCORING SURFACE

[75] Inventor: Edmund R. Michalik, West Mifflin, Pa.

[73] Assignee: PPG Industries, Inc., Pittsburgh, Pa.

[21] Appl. No.: 615,149

[22] Filed: Sept. 19, 1975

[51] Int. Cl.² .................. C03B 33/02; C03B 33/10
[52] U.S. Cl. .................................. 225/2; 225/96.5; 83/7; 83/12
[58] Field of Search ............. 83/6, 7, 12; 225/2, 225/96, 96.5; 161/149; 30/164.95

[56] References Cited

U.S. PATENT DOCUMENTS 3,865,293   2/1975   Ernsberger et al. ............ 225/2
3,865,673   2/1975   De Torre ............................ 225/2

FOREIGN PATENT DOCUMENTS 1,096,561   12/1967   United Kingdom.

Primary Examiner—Donald R. Schran
Attorney, Agent, or Firm—Donald Carl Lepiane

[57] ABSTRACT

Pieces of glass are scored using a scoring wheel having a major radius ($R_1$) and an arcuate scoring surface ($R_2$) forced against the piece at a predetermined pressure. Thereafter, the score is opened by applying heat to the score and/or a bending moment about the score.

13 Claims, 9 Drawing Figures

METHOD OF SCORING GLASS USING A SCORING WHEEL HAVING AN ARCUATE SCORING SURFACE

BACKGROUND OF THE INVENTION

1. Field of the Invention

This invention relates to an apparatus for and method of scoring a piece of refractory material, e.g., glass using a scoring wheel having an arcuate scoring surface.

2. Discussion of the Prior Art

In general, prior art scoring wheels for scoring refractory material, e.g., glass, ceramics, or glass-ceramics prior to severing have a scoring angle of from about 130° to about 180°. One of the problems associated with this type of scoring wheel is that varying degree of wing and/or spall are present at the cut edges of the glass. Normally the wing and/or spall is removed by grinding or polishing to increase the edge strength of the piece of glass. As can be appreciated by those skilled in the art, wing and/or spall are localized areas of flaws which, if not removed, generate cracks in the piece of glass.

In each of U.S. Pat. Nos. 3,865,294 and 3,865,673, there is taught a method of employing scoring wheels having a cutting angle to produce cut edges on a piece of glass that are essentially free of wing and/or spall. The cut edges of the glass piece produced in accordance to the teachings of the above-identified patents are smooth, strong, straight, pristine and perpendicular to the major surfaces of the glass.

One of the variables in the scoring methods of the above-identified patents is wheel speed. As can be appreciated eliminating scoring wheel speed as a scoring variable yields a scoring method that is easier to control.

It would be advantageous if another glass scoring method was available that produces cut edges on a piece of glass that are essentially free of wing and/or spall, smooth, strong, straight, pristine, perpendicular to the major surfaces, and avoids the need for grinding and polishing. Further, it would be advantageous if the scoring method did not have scoring wheel speed as a variable.

SUMMARY OF THE INVENTION

In general, this invention relates to producing a subsurface fissure in a piece of refractory material, e.g., glass, such that the cut edge exhibits minimal, if any, wing and/or spall.

In the practice of the invention the scoring wheel has an arcuate scoring surface. Although there is taught slitter wheels having arcuate surfaces for cutting leather, paper and cloth, e.g., slitter wheels sold by Alcon Tool Company of Akron, Ohio, there is no prior art teaching that a scoring wheel having an arcuate scoring surface can be used to produce a subsurface fissure in refractory material such as glass, glass-ceramic or ceramic.

In general, the method of the instant invention includes the steps of contacting a surface of the refractory piece with scoring facilities having an arcuate scoring surface. Relative movement is provided between the scoring surface and the refractory piece while pressure is applied to the scoring facilities to score the refractory piece along an intended path of cut. In the preferred embodiment, the score is a subsurface fissure.

Further this invention relates to a method of severing the piece of refractory material by propagating the subsurface fissure to opposed major surfaces of the piece.

This invention also relates to an apparatus for practicing the methods of the invention.

DESCRIPTION OF THE INVENTION

In general, this inventon relates to a method of scoring a piece of refractory material such as glass, ceramics or glass-ceramics using a wheel having an arcuate scoring surface to produce cut edges having minimal, if any, wing and/or spall. The term "wing" as used herein is defined as a lateral crack on either side of a score line, projected outward under the surface of the refractory material from the score line by the action of a scoring tool. The term "spall" as used herein is defined as a chip or flake out of the cut edge of the piece of refractory material.

Figure 1:
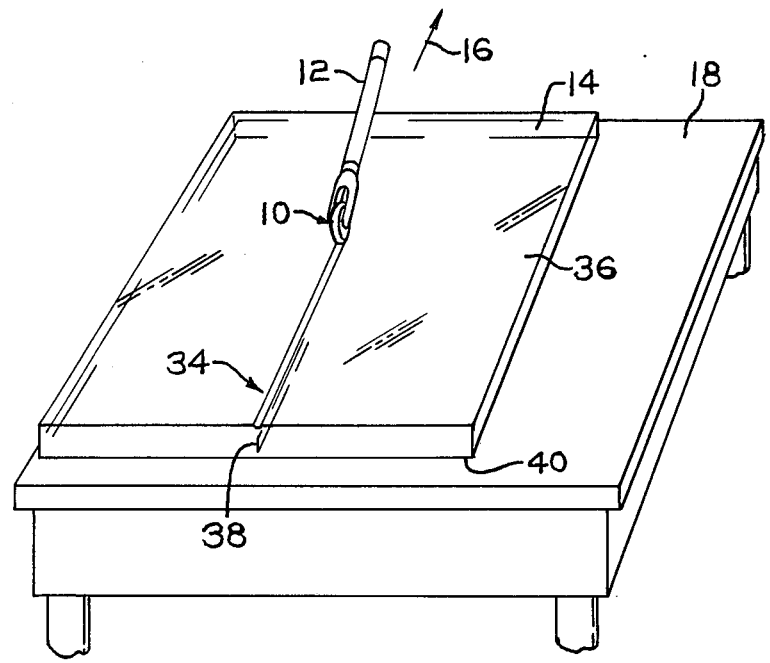
FIG. 1 is a diagrammatic view of a scoring apparatus incorporating features of the invention for scoring a piece of glass.
Figure 2:
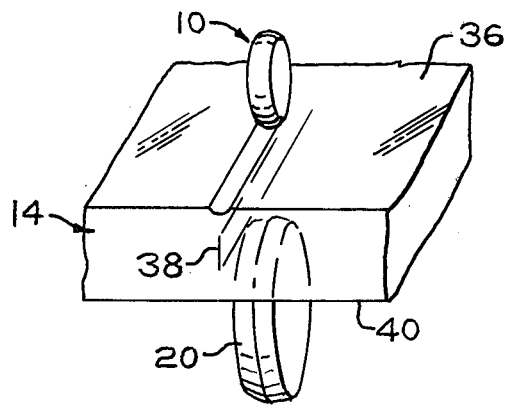
FIG. 2 is a diagrammatic view of a piece of glass with a subsurface fissure made by a scoring wheel incorporating features of the invention and a support wheel.
Figure 3:
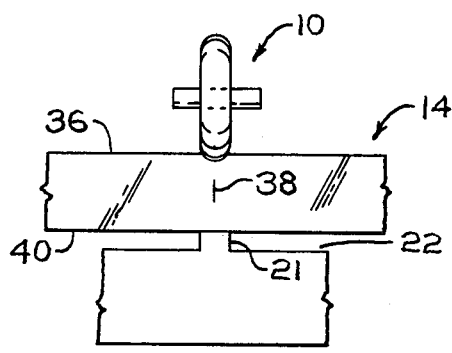
FIG. 3 is a frontal view of a piece of glass supported on a flat land during scoring in accordance to the teachings of the invention.
Figure 4:
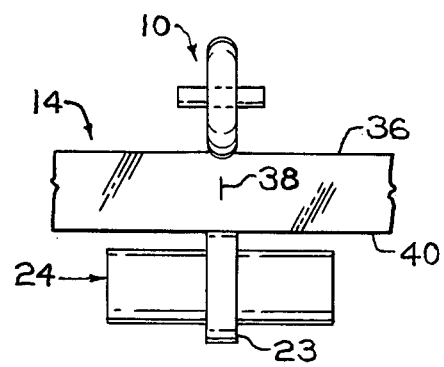
FIG. 4 is a frontal view of a piece of glass supported on a rotating circular land during scoring in accordance to the teachings of the invention.

With reference to FIG. 1, scoring wheel 10 incorporating features of the invention is mounted in a housing 12 to score a glass piece or sheet 14 along an intended path of cut in the direction of arrow 16. The piece of glass 14 may be supported on a flat surface 18 or moved between the scoring wheel 10 and a supporting wheel 20 as shown in FIG. 2. Further, the invention may be practiced by supporting the glass sheet 14 on a rib or land 21 provided on a flat surface 22 beneath the scoring wheel 10 as shown in FIG. 3. In the alternative, a land 23 may be provided on a rotatable wheel or cylinder 24 as shown in FIG. 4. The cylinder 24 rotates during scoring so as to provide a moving support just under the moving scoring wheel 10. The invention contemplates synchronously moving the scoring wheel 20 and cylinder 24 relative to the glass piece or moving the glass piece relative to the scoring wheel and cylinder 24.

As can be appreciated by those skilled in the art, there are many commercially available housings and devices for mounting the wheel 10. For example, in U.S. Pat. Nos. 3,865,294 and 3,865,673 there is taught a friction mounting and frictionless mounting for scoring wheels that may be used in the practice of the invention. The teachings of the above-identified patents are hereby incorporated by reference.

Figure 5:
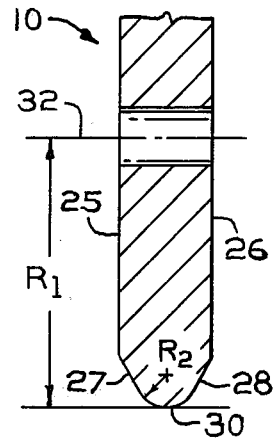
FIG. 5 is a partial vertical cross section of a scoring wheel incorporating features of the invention.

With reference to FIG. 5, the scoring wheel 10 includes a pair of opposed major wall portions 25 and 26 each having peripheral wall portions 27 and 28, respectively, sloping toward each other and a radius tip or scoring surface 30 interconnecting the wall portions 27 and 28. The wheel 10 which may be made of hardened tool steel, tungsten carbide or other suitable material of hardness of about 7 or more on the moh's scale, can be defined, in general, by four parameters. These parameters are (1) the thickness of the wheel, i.e., the distance between opposed major wall portions 25 and 26; (2) the radius ($R_1$) of the wheel as measured from the axial center 32 of the wheel 10 to the outermost peripheral edge of the wheel, i.e., the radiused scoring surface 30; (3) the length of the sloping walls 27 and 28 or the angle subtended by the sloping walls if extended to intersect and (4) the radius ($R_2$) of the arcuate scoring surface 30 or the radius of curvature of the scoring surface.

As will become apparent, the thickness of the wheel is not limiting to the invention but is selected to provide a rigid wheel. In other words, a wheel that does not collapse when a scoring force or load is applied thereto. A wheel made of hardened tool steel and having a a thickness of about ⅜ inch (0.96 centimeter) may be used with loads of up to about 500 pounds (227 kilograms) applied through the axis of the wheel. A wheel made of hardened tool steel and having a diameter of about ½ inch (1.27 centimeters) may be used with loads of up to 1,000 pounds (454 kilograms) applied through the axis of the wheel. The above are cited as examples and are not limiting to the invention.

The length or angle of the sloping walls 27 and 28 is not limiting to the invention but is selected to provide a smooth or monotonic transition between the walls 27 and 28 and a selected arcuate cutting surface 30 for a selected wheel thickness.

$R_1$ and $R_2$ of the scoring wheel as well as the applied load are selected variables of the invention to provide a subsurface fissure having minimal, if any, wing and/or spall. A "subsurface fissure" as the term is used herein is defined as a discontinuity such as a crack or score that is within the thickness of the piece of glass and does not extend to a major surface of the glass piece.

Figure 6:
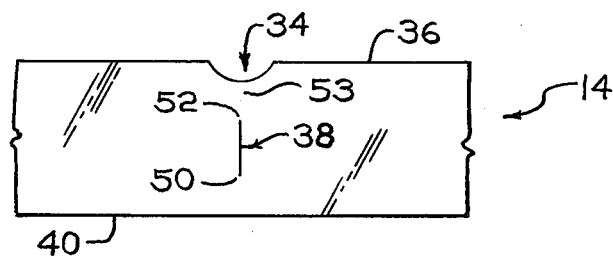
FIG. 6 is a sectional view of the piece of glass of FIG. 1 having an indentation and subsurface fissure made in accordance to the teachings of the invention.
Figure 7:
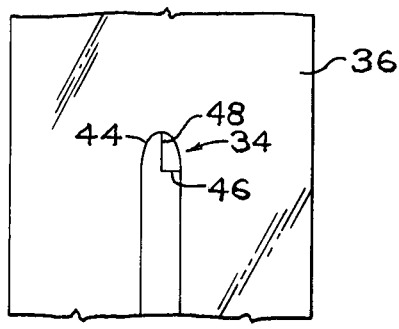
FIG. 7 is a plan view of the piece of glass with the scoring wheel removed during the scoring of the glass piece to illustrate the shape of the leading edge of the indentation.

With reference to FIG. 6, for selected $R_1$ and $R_2$ and load, the scoring wheel 10 as it moves along its intended score path produces (1) an indentation 34 on surface 36 engaged by the wheel 10 and (2) a subsurface fissure 38 between the surfae 36 and 40 of the glass piece 10. If the wheel were to be removed from the surface 36 of the piece 14 during scoring, the indentation 34 as shown in FIG. 7 would have a semi-eliptical shape at the surface 36 of the piece as shown by line 44. The semi-eliptical shaped indentation has a projected semi-minor radial axis 46 as measured in the plane of the original glass surface 36 that is related to $R_2$ of the scoring wheel 10; a projected semi-major radial axis 48 as measured at the plane of the original glass surface 36 that is related to $R_1$ of the scoring wheel 10; and a surface area determined by the walls of the indentation 34 that is a function of the applied load, $R_1$ and $R_2$.

There are two theories relating to the creation of the indentation 34. The first theory is that there is a plastic flow of glass from one area to another without any change in the total volume of glass. The second theory is that the glass is compressed or densified with a total volume of the glass being reduced. Theoretically, if the glass is densified (second theory) the index of refraction of the glass will be altered but if the glass flows plasticly (first theory) the index of refraction will not be altered. Experimental results indicate that the index of refraction immediately beneath the indentation is approximately 5 percent higher than that of normal glass. This tends to favor the theory that densification occurs beneath the indentation, but it does not eliminate the possibility that there is a small amount of flow in combination with densification. However, plastic flow requires deformation and shear which necessarily involves the breaking of interatomic bonds and those skilled in the art will recognize that this phenomenon cannot occur in a covalent material such as glass unless the material is strained at a temperature from ½ to ⅔ of its melting point in ° C. In the present case there is no reason to suspect that glass is heated to such a degree. In addition where densification occurs, tensile stresses are developed to assist in severing.

Figure 8:
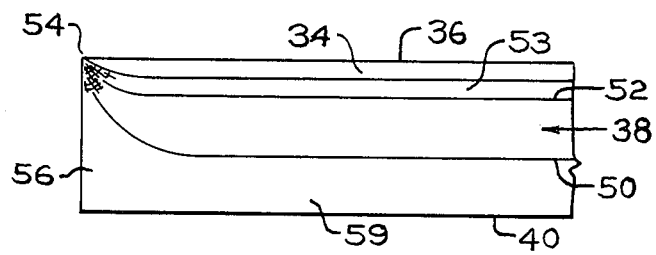
FIG. 8 is an elevation view of cut edges of a piece of glass scored in accordance to the teachings of the invention and severed.

With reference to FIGS. 6 and 8, the fissure 38 which is generally perpendicular to the surface 36 of the glass 14 has a bottom end 50 spaced from the surface 40 and a top end 52 below and spaced from the indentation 34. Between the indentation 34 and top end 52 of the fissure 38 there is a compressed layer of glass 53 having minimal, if any, wing. Further, the surface of the indentation 34 has minimal, if any, spall.

The length of the fissure as measured between the indentation 34 and bottom end 50 of the fissure 38 is a function of $R_1$, $R_2$, and the scoring load applied to the wheel 10. For a constant $R_1$ and $R_2$ increasing the load increases the fissure depth; for a constant $R_1$ and load increasing $R_2$ reduces the fissure depth; and for a constant $R_2$ and load increasing $R_1$ reduces the fissure depth.

The depth of the compression layer 53 is also a function of $R_1$, $R_2$ and load and responds in a similar manner as the fissure depth to varying $R_1$, $R_2$ and load but to a lesser degree.

In general, for producing a subsurface fissure in a piece of glass having a thickness of between about 0.175 and 1 inch (0.44 and 2.54 centimeters) supported on a flat surface, it is recommended that the scoring wheel have a major radius of between about 1 to 4 inches (2.54 to 10.6 centimeters) and a scoring surface having a radius of curvature of between about 0.005 to 0.020 inches (0.0013 to 0.0508 centimeters). When the piece of glass is supported on a flat surface as shown in FIGS. 1 and 2, the recommended load applied to the scoring wheel is between about 125 to 1500 pounds (56.7 to 682 kilograms) and when the piece of glass is supported on a land as shown in FIGS. 3 and 4, the recommended load applied to the scoring wheel is between about 100 to 1200 pounds (45.4 to 545 kilograms).

In general, as the glass thickness increases, i.e., the distance between surfaces 36 and 40, the fissure depth should be increased to facilitate severing of the glass, e.g., to reduce the amount of bending moment required to extend the fissure to opposed surfaces 36 and 40.

Referring to Table A there are shown recommended major radii ($R_1$) and radii of curvature of the scoring surface ($R_2$) for a scoring wheel and scoring load to provide recommended fissure depths for glass pieces of different thickness.

TABLE A

| | | GLASS THICKNESS IN INCHES (CENTIMETERS) | | | | | | |
|---|---|---|---|---|---|---|---|---|
| | | 1 (2.54) | 0.75 (1.90) | | | 0.5 (1.27) | | |
| Major Radius ($R_1$) | (inches) | 3 | 2 | 2 | 2 | 2 | 2 | 2 |
| | (centimeters) | (7.62) | (5.08) | (5.08) | (5.08) | (5.08) | (5.08) | (5.08) |
| Radius of Curvature of Scoring Surface ($R_2$) | (inches) | 0.010 | 0.010 | 0.012 | 0.005 | 0.010 | 0.012 | 0.005 |
| | (centimeters) | (0.035) | (0.025) | (0.305) | (0.0013) | (0.025) | (0.305) | (0.0013) |
| Scoring load when glass piece is supported on flat surface | (pounds) | 1415 | 844 | 797 | 918 | 565 | 495 | 565 |
| | (kilograms) | (641) | (382) | (314) | (416) | (210) | (224) | (210) |
| Fissure depth when glass piece is supported on a flat surface during scoring | (inches) | 0.297 | 0.200 | 0.182 | 0.218 | 0.175 | 0.144 | 0.180 |
| | (centimeters) | (0.75) | (0.51) | (0.46) | (0.55) | (0.44) | (0.37) | (0.46) |
| Scoring load using a land | (pounds) | 1178 | 703 | 647 | 765 | 471 | 412 | 471 |
| | (kilograms) | (534) | (318) | (293) | (347) | (214) | (187) | (214) |
| Fissure depth when glass piece is supported on a land during scoring | (inches) | 0.297 | 0.200 | 0.182 | 0.218 | 0.175 | 0.144 | 0.180 |
| | (centimeters) | (0.75) | (0.51) | (0.46) | (0.55) | (0.44) | (0.37) | (0.46) |

| | | 0.375 (0.95) | | | 0.184 (0.47) | | |
|---|---|---|---|---|---|---|---|
| Major Radius ($R_1$) | (inches) | 2 | 2 | 2 | 1 | 2 | 2 |
| | (centimeters) | (5.08) | (5.08) | (5.08) | (2.54) | (5.08) | (5.08) |
| Radius of Curvature of Scoring Surface ($R_2$) | (inches) | 0.010 | 0.012 | 0.005 | 0.010 | 0.012 | 0.005 |
| | (centimeters) | (0.025) | (0.0305) | (0.0013) | (0.025) | (0.305) | (0.0013) |
| Scoring load when glass piece is supported on flat surface | (pounds) | 423 | 354 | 423 | 140 | 211 | 140 |
| | (kilograms) | (191) | (160) | (191) | (64) | (96) | (64) |
| Fissure depth when glass piece is supported on a flat surface during scoring | (inches) | 0.130 | 0.120 | 0.130 | 0.048 | 0.110 | 0.060 |
| | (centimeters) | (0.33) | (0.30) | (0.33) | (0.12) | (0.28) | (0.15) |
| Scoring load using a land | (pounds) | 353 | 294 | 353 | 117 | 176 | 117 |
| | (kilograms) | (160) | (133) | (160) | (53) | (80) | (53) |
| Fissure depth when glass piece is supported on a land during scoring | (inches) | 0.130 | 0.120 | 0.130 | 0.048 | 0.110 | 0.060 |
| | (centimeters) | (0.33) | (0.30) | (0.33) | (0.12) | (0.28) | (0.15) |

As can be appreciated, the invention is not limited to the recommended $R_1$, $R_2$ and scoring load of Table A. They are merely presented as a guide in the practice of the invention. For example, for any given glass thickness $R_2$ may be decreased. However in addition to increasing the fissure depth as previously discussed, the walls 27 and 28 of the scoring wheel may contact the glass surface. When this occurs, the presence of wing and/or spall on the cut edges increases because the walls 27 and 28 tend to crack the glass during scoring. Within the teachings of the invention, the effect of the sloping walls may be obviated by increasing $R_2$ and increasing the load.

Although there is no fixed numerical relationship between $R_1$ and $R_2$, in the practice of the invention, $R_1$ is greater than $R_2$, e.g., it is recommended that $R_1$ be about 100–400 times greater than $R_2$.

With reference to Table A, the scoring load to provide a desired fissure depth can be reduced 20 percent by using a land or a supporting wheel during scoring. In this regard, using a land or supporting wheel with the same scoring load increases the fissure depth by 20 percent.

The necessary scoring load may be applied to the scoring wheel in any conventional manner. For example, the scoring load may be applied to the wheel by way of fluids such as air or oil. Still further, U.S. Pat. No. 3,760,997 teaches that a scoring wheel may be actuated by a constant reluctance motor. The teachings of the above-identified patent are hereby incorporated by reference.

It has been found that the scoring speed has little, if any, effect in the quality and depth of the fissure or on the quality of the score, e.g., does not increase or decrease the presence of wing about the score and/or spall at the cut edges.

In U.S. Pat. Nos. 3,865,673 and 3,865,294 there are taught scoring methods to provide cut edges of a piece of glass that are essentially free of wing and/or spall. One of the scoring parameters as taught in the above-mentioned patents, is cutting speed. Exceeding the recommended cutting speeds increases the possibility of wind and/or spall at the cut edges of the glass piece.

The radiused scoring wheel of the instant invention is not dependent on speed thereby providing a scoring method that is easier to control.

With reference to FIG. 8, the fissure 38 is initiated at a portion of damaged glass 54 at the surface 36. The portion 54 of damaged glass is very small and the depth is very shallow to minimize edge damage. The surface 36 may be crushed to initiate the score by tapping the surface with a rigid object, impacting the surface with the scoring wheel, or rotatably urging the scoring wheel against the surface.

The scoring wheel 10 is then moved from the portion 54 of crushed glass relative to the glass piece under the recommended load to score the glass as shown in FIGS. 1, 2, 3 or 4.

The ends 52 and 50 of the fissure 38 may be extended to adjacent surfaces 36 and 40, respectively, in any conventional manner to sever the glass. For example, a bending moment may be applied about the fissure or heat may be applied to the fissure. Examples of extending the fissure to both surfaces are taught in U.S. Pat. Nos. 3,795,572; 3,756,482 and 3,795,502 which teachings are hereby incorporated by reference.

In the practice of the scoring method taught in U.S. Pat. Nos. 3,865,293 and 3,865,673 and subsurface score and pseudosubsurface score extends in the same direction as the scoring wheel. Therefore, if the scoring wheel is not perpendicular to the glass surface the resultant score will not be perpendicular to the glass surface.

In the practice of the instant invention, the scoring wheel need not be perpendicular to the surface of the glass to provide a resultant perpendicular score. This is because the scoring wheel has a radiused scoring surface. It should be noted however, as the wheel is angled toward the glass surface, the scoring load should be increased.

An examination of the cut surface 56 as shown in FIG. 8 shows the small portion 54 of crushed glass at the surface 36, a portion of the indentation 34, a compressed layer 53 of glass between the indentation 34 and end 52 of the fissure 38, the fissure 38 and an area of glass between end 50 and surface 40 of the glass piece.

The cut edges of the glass except for area 54 are smooth, strong, straight, pristine and perpendicular to the major surfaces of the piece of glass.

The cut edge of the glass provided in accordance to the teachings of the invention has a modulus of rupture (MOR) of about 5,500 pounds per square inch (356 kilograms per square centimeter). This compares favorably with a ground and polished glass edge which has an MOR of 5,500 pounds per square inch (356 kilograms per square centimeter).

The tests for MOR were made in accordance to ASTM test procedures C-158-72 entitled "Standard Methods for Flexure Testing of Glass".

Although not limiting to the invention, it is recommended that the cut edges of the glass piece be lightly seamed in any conventional manner. This is to (1) eliminate glass damage at 54; (2) prevent persons from cutting themselves when handling the cut edges of the glass piece; and (3) minimize chipping of the glass edge.

Although a preferred embodiment of the present invention incorporates a scoring wheel or disc, other means will become apparent to carry out the present invention.

It is anticipated that the present invention may be used to cut edges other than straight edges. Further, bent or other forms of flat glass may be cut in accordance to the teachings of the invention. In addition, the invention may also be practiced in cutting glass objects such as thick cylinders, rods and tubes or to cut other refractories, such as ceramics, e.g., Monofrax ® sold by the Cardorundum Corporation, and glass-ceramics, e.g., Hercuvit ® sold by PPG Industries, Inc.

DETAILED DESCRIPTION OF THE INVENTION

In the following Example I, the invention is practiced to sever a piece of glass having a thickness of about 0.75 inch (1.91 centimeters) supported on a flat surface. In Example II the invention is practiced to sever the piece of glass of Example I supported on a land.

In Example III, the invention is practiced to sever a piece of glass having a thickness of about 0.375 inch (0.95 centimeter) supported on a flat surface. Example IV illustrates the practice of the invention to sever the glass of Example III supported on a land.

EXAMPLE 1

In this example, the invention is used to sever a piece of glass 14 having a length of about 3 feet (0.9 meter), a width of about 2 feet (0.6 meter) and a thickness of about 0.75 inch (1.91 centimeters).

With reference to FIG. 5, a scoring wheel incorporating features of the invention has a thickness of about ½ inch (1.27 centimeters) as measured between wall portion 25 and 26; a major radius ($R_1$) of about 2 inches (5.08 centimeters) as measured from axial center 32 of the wheel to the outer periphery of the wheel; and scoring surface havin a radius ($R_2$) of about 0.010 inch (0.025 centimeter).

The scoring wheel is mounted in a housing 12 in any conventional manner.

With reference to FIG. 1, the piece of glass 14 is supported on a flat surface 18 and the scoring surface of the wheel is rotatably urged against top surface 36 to crush a portion 54 (see FIG. 8) of the top surface 36. Thereafter a load of about 589 pounds (268 kilograms) is applied to the wheel and the wheel is moved along an intended path of cut 16 at a speed of about 100 inches/minute (254 centimeters/minute) to provide a subsurface fissure 38 in the piece of glass.

The fissure 38 is perpendicular to and spaced from the top and bottom surfaces 36 and 40 as shown in FIG. 6. The fissure depth, including the compression layer depth, is about 0.106 inch (0.269 centimeter).

Although not limiting to the invention, during scoring the axial center of the wheel is generally parallel to the top surface 36 of the glass 14. If the center axis of the scoring wheel is not parallel to top surface of the glass, a slightly larger pressure is required because the load is applied at an angle to a line normal to the top surface of the glass. However, the resultant subsurface fissure 36 still remains perpendicular to and spaced from the surface 36 and 40 of the glass.

Figure 9:
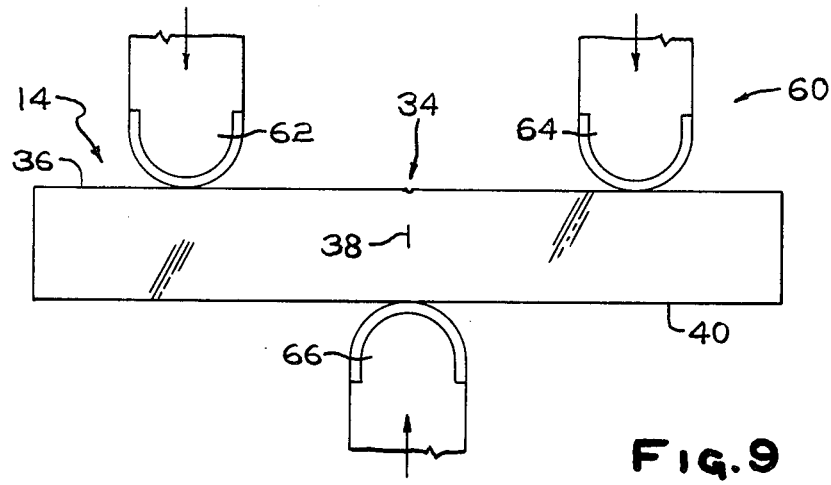
FIG. 9 is an elevation view of a snapping apparatus in position to apply a bending moment about the score.

Referring to FIG. 9, there is shown an elevation view of a snapping apparatus 60 in position to apply a bending moment about subsurface fissure 38. The apparatus includes two top anvils 62 and 64, and a bottom anvil 66. The bottom anvil 66 is placed against bottom surface 40 under the subsurface fissure 38 and the top anvils 62 and 64 against the top surface 36 about the subsurface fissure 38. The bending moment extends the fissure to the top and bottom surface to sever the glass.

The crushed portion 54 and the cut edges of the glass are lightly seamed in any conventional manner.

EXAMPLE II

In this example, the cutting wheel of Example I is used in combination with the wheel 24 as shown in FIG. 4 to score the piece of glass of Example I.

The wheel 24 has a diameter of about 6.0 inches (15.2 centimeters) and a land 23 having a diameter of about 6.25 inches (15.835 centimeters) and a surface 0.25 inch (0.635 centimeter) wide.

The score is initiated as previously discussed and the score run under a load of about 589 pounds (268 kilograms).

The fissure depth, including the compression layer depth is 0.137 (0.348 centimeter).

A bending moment is applied to the glass and the cut edges are lightly seamed as previously discussed.

The cut edges of the glass of Examples I and II are smooth, strong, straight, pristine and perpendicular to the major surfaces of the glass. The MOR of the cut edge is approximately 5,500 pounds per square inch (356 kilograms per square centimeter) and after seaming the glass edge has a MOR of about 6,000 pounds per square inch (422 kilograms per square centimeter). The MOR was determined in accordance with ASTM testing procedure C-158-72.

EXAMPLE III

In this example, a piece of glass about 3 feet (0.9 meter) by about 2 feet (0.6 meter) and a thickness of about 0.375 inch (0.95 centimeter) is cut.

With reference to FIG. 3, a scoring wheel 10 has a thickness of ⅜ inch (0.96 centimeter) as measured between wall portions 22 and 24; an $R_1$ of about 2 inches (5.08 centimeters) and a scoring surface having a scoring radius $R_2$ and about 0.010 inch (0.025 centimeter). The pressure applied to the scoring wheel during scoring is about 473 pounds (216 kilograms). The scoring speed was 50 inches/minute (129 centimeters/minute.

The glass is supported on the flat surface 18 and the score initiated and run as taught in Example I.

The fissure depth, including the compression layer depth, is about 0.135 inch (0.223 centimeter).

Thereafter a bending moment is applied about the score to sever the glass and the cut edges lightly seamed as previously discussed.

EXAMPLE IV

The piece of glass of Example III is score using the scoring wheel of Example III and the wheel 24 as shown in FIG. 4. The wheel 24 having a diameter of about 6.25 inches (15.835 centimeters) and a surface 0.25 inch (0.635 centimeter) wide.

The scoring is accomplished as taught in Example II but in this instance a pressure of about 353 pounds (160 kilograms) is applied to the scoring wheel. The scoring wheel is moved along the intended path of cut at a speed of 50 inches/minute (127 centimeters/minute).

The fissure depth, including the compression layer depth, is about 0.135 inch (0.457 centimeter).

A bending moment is applied about the score to sever the glass and the cut edges lightly seamed as previously discussed.

The cut edges of the glass pieces of Examples III and IV are smooth, strong, straight, pristine and perpendicular to the major surfaces of the glass. The edge strength prior to seaming is about 5,500 pis (356 kilograms per square centimeter) and after seaming is about 6,000 pounds per square inch (422 kilograms per square centimeter) as measured by the previously mentioned testing method.

As can be appreciated, the above examples are merely illustrative of the invention and the invention is not limited thereto.

What is claimed is:

1. In a method of scoring a refractory material selected from the group consisting of glasses, ceramics and glass-ceramics wherein the method includes the steps of contacting a surface of the refractory material with scoring means; providing relative movement between the scoring means and the piece of refractory material, while applying pressure to the scoring means to provide the refractory material with a score along a predetermined score path, the improvement comprising:

the imposing an indentation in the surface, the indentation during scoring has a substantially constant predetermined radius of curvature along its depth when viewed through an intersecting plane normal and transverse to the score path 2. The method as set forth in claim 1 wherein said contacting step includes the step of:

fracturing a portion of the surface of the refractory material to initiate the score.

3. In a method of severing a piece of refractory material selected from the group consisting of glasses, ceramics and glass-ceramics wherein the method includes the steps of contacting a surface of the piece with scoring means; applying a pressure to the scoring means; displacing the scoring means and piece relative to one another to provide the piece with a score along an intended path of cut; and extending the score between opposed surfaces of the piece to sever the piece, the improvement comprising the steps of:

imposing a score including (1) an indentation in the surface, the indentation during scoring has a substantially constant predetermined radius of curvature along its depth when viewed through an intersecting plane normal and transverse to the intended path of cut and (2) a fracture below the indentation.

4. The method as set forth in claim 3 wherein said contacting step includes the step of:

fracturing a portion of the surface of the piece of refractory material to initiate the score.

5. An apparatus for scoring a piece of refractory material selected from the group consisting of glass, ceramics or glass-ceramics, comprising:

means for supporting the piece;
   a scoring means having a circumferential arcuate scoring surface, the cross-section of the arcuate scoring surface having a substantially constant predetermined radius of curvature when viewed in a plane containing rotating axis of said scoring means;
   means for urging said scoring means toward said supporting means under pressure; and
   means for providing relative motion between said supporting surface and the scoring surface to score the piece along an intended path of cut.

6. The apparatus as set forth in claim 5 further including:

means for extending the score between opposed surfaces of the piece.

7. The apparatus as set forth in claim 5 wherein said scoring means is a wheel having a major radius as measured from the axial center of the scoring wheel to the scoring surface that is about 100–400 times greater than the radius of curvature of the scoring surface.

8. The method as set forth in claim 1 wherein the scoring means is a wheel and further includes the step of maintaining the rotating axis of the scoring wheel generally parallel to the contacted surface and transverse to the score path.

9. The method as set forth in claim 1 wherein the scoring means is a wheel and further includes the step of maintaining the rotating axis of the scoring wheel is at an oblique angle to the contacted surface and transverse to the score path.

10. The method as set forth in claim 3 wherein the scoring means is a wheel and further includes the step of maintaining the rotating axis of the scoring wheel is generally parallel to the contacted surface and transverse to the path of cut.

11. The method as set forth in claim 3 wherein the scoring means is a wheel and further includes the step of maintaining the rotating axis of the scoring wheel at an oblique angle to the contacted surface and transverse to the path of cut.

12. The apparatus as set forth in claim 5 wherein the rotating axis of said scoring means is generally parallel to said supporting surface.

13. The apparatus as set forth in claim 5 wherein the rotating axis of said scoring means is at an oblique angle to said supporting surface.

* * * * *

UNITED STATES PATENT AND TRADEMARK OFFICE
CERTIFICATE OF CORRECTION

PATENT NO. : 4,057,184

DATED : November 8, 1977

INVENTOR(S) : Edmund R. Michalik

It is certified that error appears in the above-identified patent and that said Letters Patent are hereby corrected as shown below:

Column 3, line 52, "surfae" should be "surface".

Column 7, line 48, "Cardorundum" should be "Carborundum"

Column 9, line 25, after "24" insert --has a diameter of about 6.0 inches (15.2 centimeters) and a land 23--.

Column 9, line 41, "pis" should be "psi".

Column 10, line 50, Claim 9, after "wheel" delete "is".

Column 10, line 55, Claim 10, after "wheel" delete "is".

Signed and Sealed this

Twenty-first Day of March 1978

[SEAL]

Attest:

RUTH C. MASON
Attesting Officer

LUTRELLE F. PARKER
Acting Commissioner of Patents and Trademarks